US012248209B2

(12) United States Patent
Zhai et al.

(10) Patent No.: US 12,248,209 B2
(45) Date of Patent: Mar. 11, 2025

(54) DIMMING GLASS AND MANUFACTURING METHOD THEREOF

(71) Applicants: Beijing BOE Sensor Technology Co., Ltd., Beijing (CN); BOE TECHNOLOGY GROUP CO., LTD., Beijing (CN)

(72) Inventors: Deshen Zhai, Beijing (CN); Chunlei Wang, Beijing (CN); Sikai Zhang, Beijing (CN); Ying Wang, Beijing (CN); Peng Liang, Beijing (CN); Xiaoqian Ju, Beijing (CN); Xiaolong Wu, Beijing (CN); Changyin Wang, Beijing (CN); Zhan Li, Beijing (CN); Juan Chen, Beijing (CN); Yongzhong Zhang, Beijing (CN); Jing Pang, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/275,684

(22) PCT Filed: Mar. 31, 2022

(86) PCT No.: PCT/CN2022/084545
§ 371 (c)(1),
(2) Date: Aug. 3, 2023

(87) PCT Pub. No.: WO2023/184394
PCT Pub. Date: Oct. 5, 2023

(65) Prior Publication Data
US 2025/0013088 A1  Jan. 9, 2025

(51) Int. Cl.
G02F 1/133  (2006.01)
G02F 1/1333  (2006.01)
G02F 1/1339  (2006.01)

(52) U.S. Cl.
CPC .... *G02F 1/13306* (2013.01); *G02F 1/133354* (2021.01); *G02F 1/1339* (2013.01)

(58) Field of Classification Search
CPC ............ G02F 1/13306; G02F 1/13452; G02F 1/1339; G02F 1/133305; G02F 1/1345
See application file for complete search history.

(56) References Cited

U.S. PATENT DOCUMENTS

2021/0208436 A1 * 7/2021 Wang ................... G02F 1/13452
2022/0003038 A1   1/2022 Chen et al.
(Continued)

FOREIGN PATENT DOCUMENTS

CN   201589915 U   9/2010
CN   203383683 U   1/2014
(Continued)

*Primary Examiner* — Joseph L Williams
(74) *Attorney, Agent, or Firm* — WHDA, LLP

(57) ABSTRACT

The present disclosure provides a dimming glass and a method for manufacturing the dimming glass. The dimming glass includes: at least one dimming functional layer sandwiched between two glass substrates, where a plurality of conductive leads is connected to a bonding circuit board, and a sealant filled between sealant regions of the two glass substrates. Each conductive lead includes a connecting end, a protruding end and an extension segment. The connecting end is connected to the bonding circuit board, the protruding end extends out of an outer side of an edge of the glass substrate, at least a part of the extension segment extends in a first direction which is an extension direction of an edge of (Continued)

the bonding side of the dimming functional layer, and the extension segment is located in the sealant region and is secured through the sealant.

20 Claims, 3 Drawing Sheets

(56) References Cited

U.S. PATENT DOCUMENTS

| | | | |
|---|---|---|---|
| 2022/0137443 | A1 | 5/2022 | Hu et al. |
| 2022/0197071 | A1 | 6/2022 | Hu et al. |
| 2022/0390780 | A1 | 12/2022 | Hu et al. |

FOREIGN PATENT DOCUMENTS

| | | | |
|---|---|---|---|
| CN | 211058677 U | | 7/2020 |
| CN | 212950074 U | | 4/2021 |
| CN | 113820896 A | | 12/2021 |
| CN | 113960840 A | | 1/2022 |
| CN | 113960842 A | | 1/2022 |
| CN | 114002871 A | | 2/2022 |
| JP | 6635156 B1 | | 1/2020 |
| WO | 2021/174540 A1 | | 9/2021 |
| WO | 2021/237504 A1 | | 12/2021 |
| WO | WO-2024045109 A1 | * | 3/2024 |

* cited by examiner

DIMMING GLASS AND MANUFACTURING METHOD THEREOF

CROSS-REFERENCE TO RELATED APPLICATION

The present application is the U.S. national phase of PCT Application No. PCT/CN2022/084545 filed on Mar. 31, 2022, which is incorporated herein by reference in its entirety.

TECHNICAL FIELD

The present disclosure relates to the field of dimming glass technology, in particular to a dimming glass and a method for manufacturing the dimming glass.

BACKGROUND

A dimming glass is a new type of special photoelectric glass product, which combines a dye liquid crystal dimming glass or film layer into two layers of tempered glass, and is a sandwich structure formed integrally through an adhesive at a high temperature and a high pressure. The applications of the dimming glass in the construction field mainly include an exterior facade curtain wall and a skylight.

In the process of installing the dimming glass into the building facade and skylight, a connection defect of lines occurs easily.

SUMMARY

The present disclosure provides in some embodiments a dimming glass and a method for manufacturing the dimming glass, so as to reduce the probability that an electrical connection structure of the dimming glass is damaged during the installation process, and ensure the normal driving of a dimming functional layer.

The present disclosure provides the following technical solutions.

The present disclosure provides in some embodiments a dimming glass, including: two glass substrates arranged oppositely to form a cell, at least one dimming functional layer arranged between the two glass substrates, where an edge of each glass substrate has a sealant region which is not covered by the dimming functional layer, at least one side of the dimming functional layer is a bonding side, a bonding circuit board is arranged at the bonding side of the dimming functional layer, and a plurality of conductive leads is connected to the bonding circuit board, and a sealant filled between sealant regions of the two glass substrates. Each conductive lead includes a connecting end, a protruding end and an extension segment connecting the connecting end and the protruding end, the connecting end is connected to the bonding circuit board, the protruding end extends to an outer side of an edge of the glass substrate, at least a part of the extension segment extends in a first direction, the first direction is an extension direction of an edge of the bonding side of the dimming functional layer, and the extension segment is at least partially located in the sealant region and secured through the sealant.

Illustratively, the extension segment is laid in the sealant region of at least one of the glass substrates, at least one fixing structure is secured in the sealant region, and the extension segment is partially secured in the sealant region through the fixing structure.

Illustratively, each fixing structure includes a clamping member, the clamping member includes a clamping main body, a channel is provided in such a manner as to penetrate through the clamping main body, and the extension segment passes through the channel and is secured to the channel through a solid adhesive.

Illustratively, the clamping main body includes two shells capable of being connected to each other in a snap-fit manner, the two shells are hinged to each other at one side and connected to each other at the other side via a snap-fitting assembly, a groove is formed in each shell, and when the two shells are connected to each other in the snap-fit manner, two grooves cooperate to form the channel.

Illustratively, there is one dimming functional layer, and at least two conductive leads are connected to the bonding circuit board and pass through the channel of a same clamping member. Alternatively, there are at least two dimming functional layer, at least two conductive leads are connected to the bonding circuit board of each dimming functional layer, and multiple conductive leads of the at least two dimming functional layers pass through the channel of a same clamping member.

Illustratively, the quantity of fixing structures is at least two.

Illustratively, the fixing structure is secured to the glass substrate through an adhesive.

Illustratively, the extension segment is configured to: after extending from the connecting end, bend towards a side where the dimming functional layer is located, and after extending in the first direction for a predetermined distance, bend towards the outer side of the glass substrate and extend out of the glass substrate.

Illustratively, the fixing structure has a maximum length of 1 cm to 10 cm in the first direction, a maximum height of 1 mm to 25 mm in a second direction perpendicular to the glass substrate, and a maximum width of 1 mm to 20 mm in a third direction perpendicular to the first direction and the second direction, and the channel has a maximum inner diameter of 1 mm to 10 mm.

Illustratively, the bonding circuit board includes conductive spacers to which the conductive leads are directly connected through welding.

Illustratively, a welding position where each conductive lead is connected to each conductive spacer through welding is wrapped with an anti-oxidation protection layer.

Illustratively, the dimming glass further includes a support frame located between the two glass substrates and at a periphery of the dimming functional layer, and the sealant region is located at a periphery of the support frame.

The present disclosure further provides in some embodiments a method for manufacturing the above-mentioned dimming glass, including: attaching the dimming functional layer to one of the glass substrates, laying the plurality of conductive leads at the bonding side of the dimming functional layer in the sealant region, placing the other one of the glass substrates on the dimming functional layer, and filling the sealant between the sealant regions of two the glass substrates, where the extension segment is secured through the sealant.

Illustratively, subsequent to laying the plurality of conductive leads at the bonding side of the dimming functional layer in the sealant region, the method further includes: securing the extension segment through the fixing structure, and securing the fixing structure to the glass substrate through an adhesive.

The embodiments of present disclosure have the following beneficial effects.

In the dimming glass and the method for manufacturing the dimming glass in the embodiments of the present disclosure, an electrical connection portion of the dimming functional layer arranged between the two glass substrates is improved, the plurality of conductive leads connected to the bonding circuit board extends along the edge of the bonding side of the dimming functional layer for a distance and then extends out of the glass substrates, i.e., the connecting end and the protruding end of each conductive lead are spaced apart from each other by a certain distance, and the conductive leads are secured through the sealant. In this way, when the dimming glass is installed into a building curtain wall or a skylight, it is able to mitigate the electrical connection failure of the dimming functional layer due to the pulling of the conductive leads, provide a simple and effective structure having a low cost, and save a high cost of replacing the dimming glass due to the electrical connection failure.

DETAILED DESCRIPTION

Figure 1:
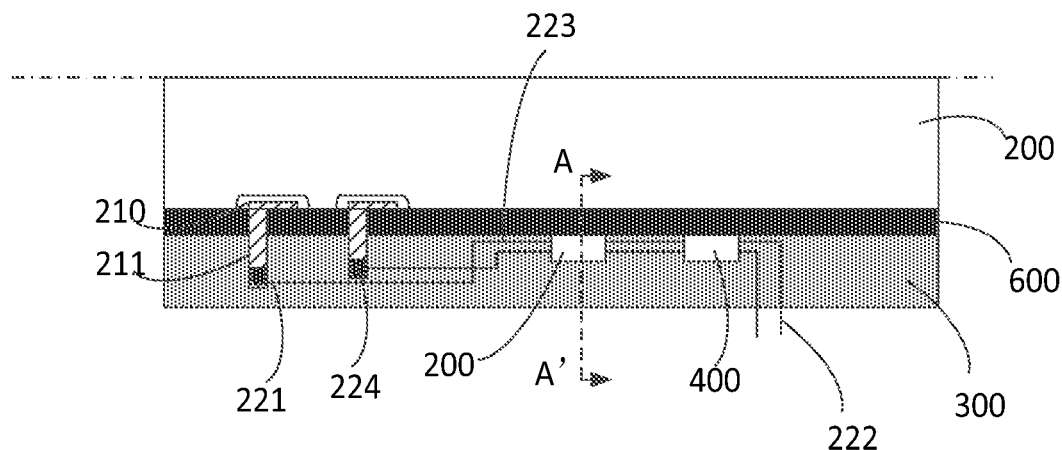
FIG. 1 is a schematic view showing a dimming glass according to some embodiments of the present disclosure.

In order to make the objects, the technical solutions and the advantages of the present disclosure more apparent, the present disclosure will be described hereinafter in a clear and complete manner in conjunction with the drawings and embodiments. Apparently, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Before the detailed description on the embodiments of the present disclosure, it is necessary to describe the related art as follows.

In the related art, a dye liquid crystal dimming glass needs to be designed as a hollow tempered glass structure mainly including an exterior tempered glass and an interior tempered glass oppositely arranged, and a dimming functional layer arranged between the exterior tempered glass and the interior tempered glass, as well as an aluminium frame and an adhesive further arranged between the exterior tempered glass and the interior tempered glass. The aluminium frame and the adhesive are arranged surrounding a peripheral of the dimming functional layer, and an electrical connection portion of the dimming functional layer is integrated into the dimming glass structure.

In the related art, the electrical connection portion of the dimming functional layer is secured in the following manner. The bonding circuit board of the dimming functional layer is directly connected to the printed circuit board at an outer side of the bonding circuit board, the printed circuit board is secured on the glass substrate in a snap-fit manner, one or more conductive leads are connected to the printed circuit board through welding and exposed at a side surface of the dimming glass. When the dimming glass is installed into a building facade and a skylight, an installation construction process is relatively violent, e.g., the dimming glass may be forced into and embedded into a metal section bar, so that the electrical connection leads are squeezed and pulled between the side surface of the dimming glass and the metal section bar, and a pulling force is transmitted to the printed circuit board and the bonding circuit board, leading to the loosening of the electrical connection and the occurrence of an open circuit, and finally a dimming defect phenomenon (e.g., the dimming glass is unable to be energized or a contact defect occurs) occurs frequently in the installed dimming glass. In a later stage, it is troublesome and dangerous to disassemble and repair the installed dimming glass having the defect, and a replacement cost is high. Therefore, there is an urgent need to mitigate the electrical connection failure caused during the installation process of the dimming glass.

In order to address the above-mentioned issues, in some relevant technologies, the dimming functional layer mainly includes upper and lower substrates and a liquid crystal layer located between the upper and lower substrates, grooves are formed in the upper and lower substrates, the conductive leads are placed in the grooves, and the conductive leads in the grooves are pressed and secured through the upper and lower substrates. However, the above-mentioned scheme is only for the structure of the dimming functional layer. The dimming glass further includes an exterior glass and an interior glass, so it is unable to secure the conductive leads by merely using the grooves in the upper and lower substrates of the dimming functional layer. Furthermore, it requires to form the grooves in the upper and lower substrates, an additional manufacturing process and additional costs are required. In addition, in a lamination process, there is a height level difference at a region of each groove in the upper and lower substrates, and cracks and edge collapse are liable to occur due to a local excessive pressure.

In order to address the above-mentioned issues, the embodiments of the present disclosure provide a dimming glass and a method for manufacturing the dimming glass, so as to reduce the probability that an electrical connection structure of the dimming glass is damaged during the installation process, and ensure the normal driving of the dimming functional layer.

As shown in FIGS. 1 to 4, the present disclosure provides in some embodiments a dimming glass, including: two glass substrates 100 arranged oppositely to form a cell, at least one dimming functional layer 200 arranged between the two glass substrates 100 and a sealant 300. An edge of each glass substrate 100 has a sealant region 110 which is not covered by the dimming functional layer 200, at least one side of the dimming functional layer 200 is a bonding side, a bonding circuit board 210 is arranged at the bonding side of the dimming functional layer 200, and a plurality of conductive leads 220 is connected to the bonding circuit board 210. The sealant 300 is filled between the sealant regions 110 of the two glass substrates 100. Each conductive lead 220 includes a connecting end 221, a protruding end 222 and an extension segment 223 connecting the connecting end 221 and the protruding end 222, the connecting end 221 is connected to the bonding circuit board 210, the protruding end 222 extends out of an outer side of an edge of the glass substrate 100, at least a part of the extension segment 223 extends in a first direction X, the first direction X is an extension direction of the edge of the bonding side of the dimming functional layer 200, and the extension segment 223 is at least partially located in the sealant region 110 and secured through the sealant 300.

In the above-mentioned scheme, an electrical connection portion of the dimming functional layer 200 arranged between two glass substrates 100 is improved, the plurality of conductive leads 220 connected to the bonding circuit board 210 extends along the edge of the bonding side of the dimming functional layer 200 for a distance and then extends out of the glass substrates 100, i.e., the connecting end 221 and the protruding end 222 of each conductive lead 220 are spaced apart from each other by a certain distance, and the conductive leads 220 are secured through the sealant 300. In this way, when the protruding end 222 of the conductive lead 220 is pulled through an external force, the conductive lead 220 is secured through the sealant 300, and the protruding end 222 and the connecting end 221 are spaced apart from each other by the certain distance, as compared with the scheme in the related art that the conductive lead 220 is directly extracted from the printed circuit board, it is able for the sealant 300 to provide better protection for the conductive leads 220, so that the conductive leads 220 are not easy to be pulled out. Therefore, when the dimming glass is installed into a building curtain wall or a skylight, it is able to mitigate the electrical connection failure of the dimming functional layer 200 due to the pulling of the conductive leads 220, provide a simple and effective structure, realize a low cost as compared with the manner of the grooves in the glass substrates 100, and save a high cost of replacing the dimming glass due to the electrical connection failure.

It should be appreciated that, the connecting end 221 may be at least partially or fully located in a region covered by the sealant 300, namely, an orthogonal projection of the connecting end 221 onto the glass substrate 100 at least partially overlaps an orthographic projection of the sealant 300 onto the glass substrate 100. When the protruding end 222 extends to the outside of the edge of the glass substrate 100, it means that the protruding end 222 is at least partially located outside the region covered by the sealant 300, i.e., an orthogonal projection of the protruding end 222 onto the glass substrate 100 is at least partially located outside the orthographic projection of the sealant onto the glass substrate.

It should be appreciated that, in the above-mentioned solution, at least a part of the extension segment 223 extends in the first direction X, a main object thereof is to enable the connecting end 221 and the protruding end 222 to be spaced apart from each other by the certain distance, and a routing direction of the extension segment 223 extends substantially in the first direction X, and may be completely identical to the first direction X or may not be parallel to the first direction X, as long as it extends substantially in the first direction X.

The dimming functional layer 200 may include at least one of a dye liquid crystal dimming layer, a polymer dispersed liquid crystal dimming layer, an electrochromic dimming layer, etc. The dimming functional layer may include an upper substrate and a lower substrate, and a dye liquid crystal layer or a polymer dispersed liquid crystal layer or an electrochromic layer between the upper and lower substrates. Such an electrical driving structure as a driving electrode, a thin film transistor, an alignment layer is arranged on the upper and lower substrates. The upper and lower substrates may each be any appropriate substrate, such as a flexible substrate or a rigid substrate. The bonding circuit board 210 is connected to the bonding side of the dimming functional layer 200. It should be appreciated that the specific structure of the dimming functional layer 200 is not particularly defined herein.

Figure 3:
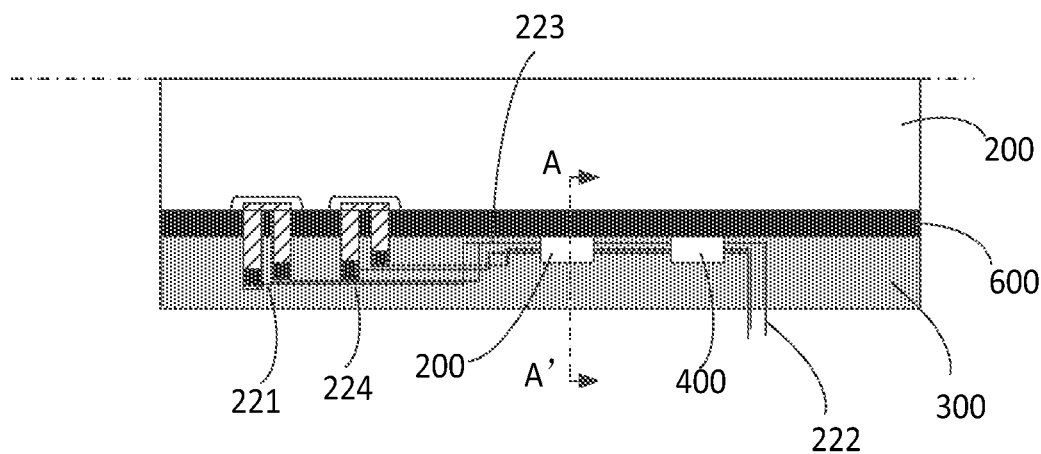
FIG. 3 is another schematic view showing the dimming glass according to some other embodiments of the present disclosure.

In some exemplary embodiments of the present disclosure, as shown in FIGS. 1 and 3, the extension segment 223 is laid in the sealant region 110 of at least one of the glass substrates 100, at least one fixing structure 400 is secured in the sealant region 110, and the extension segment 223 is partially secured in the sealant region 110 through the fixing structure 400.

Based on the above-mentioned solution, the conductive leads 220 are secured through the fixing structure 400, and the fixing structure 400 is secured in the sealant region 110, so that when the conductive leads 220 are pulled, a stress may be released at a position where the fixing structure 400 is secured to the glass substrate 100. In this way it is unable to destroy the connection between the conductive leads 220 and the bonding circuit board 210 and the connection between the bonding circuit board 210 and the dimming functional layer 200 due to pulling of the conductive leads 220, and it is able to efficiently avoid the electrical connection failure caused by directly extracting the conductive lead 220 from the printed circuit board in the related art, and save the high cost of replacing the dimming glass.

Figure 2:
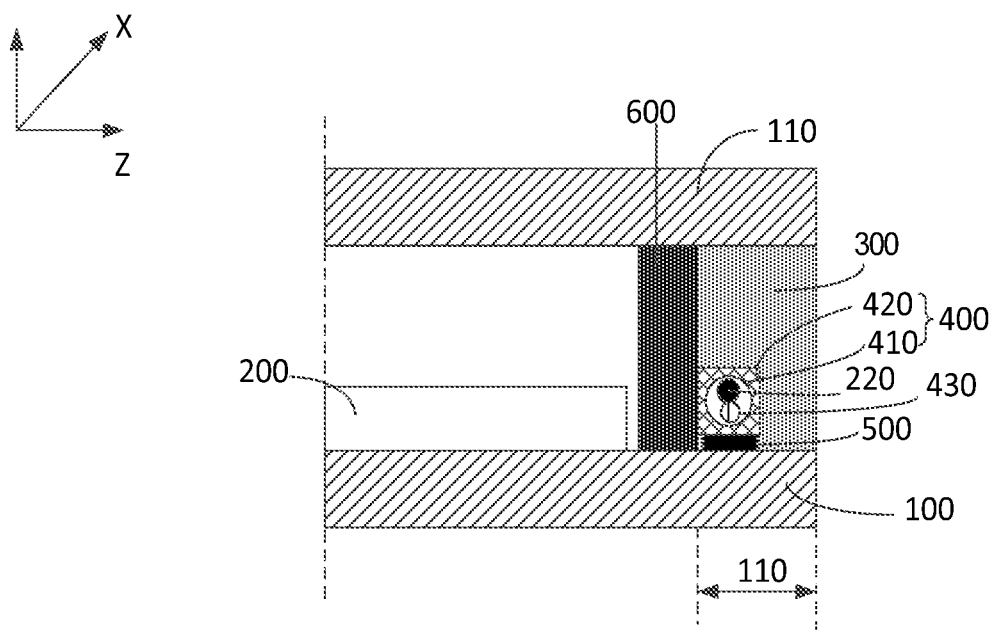
FIG. 2 is a sectional view of the dimming glass in FIG. 1 along A-A.
Figure 4:
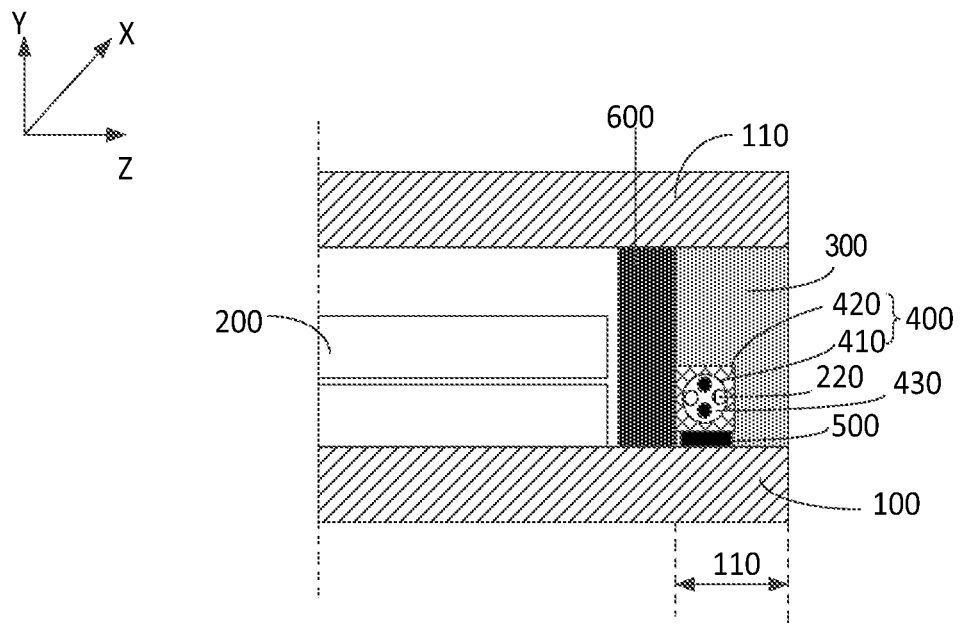
FIG. 4 is a cross-sectional view of the dimming glass in FIG. 3 along A-A.

In some embodiments of the present disclosure, as shown in FIGS. 2 and 4, the fixing structure 400 is secured to the glass substrate 100 through an adhesive 500. The adhesive 500 may be a strong adhesives, so as to enhance the securing strength of the fixing structure 400. In this way, the fixing structure 400 may be firmly secured to the glass substrate 100 through the adhesive 500 and the sealant 300.

It should be appreciated that the above embodiments are for illustrative purposes only, but shall not be used to limit the manner in which the fixing structure 400 is secured.

In addition, illustratively, the fixing structure 400 includes a clamping member, the clamping member includes a clamping main body 420, a channel 410 is provided in such a manner as to penetrate through the clamping main body 420, and the extension segment 223 passes through the channel 410 and is secured to the channel 410 through a solid adhesive 430.

Based on the above-mentioned scheme, the extension segment 223 of the conductive lead 220 passes through the channel 410 of the clamping member, and the solid adhesive 430, such as a glass cement, a silicone adhesive or a resin adhesive, may be coated in the channel 410 in the clamping main body 420, and the conductive lead 220 is firmly secured to the clamping member via the solid adhesive 430. It should be appreciated that a specific structure of the fixing structure 400 is by no means limited thereto. For example, the fixing structure 400 may also be any other appropriate fixing structure such as a buckle. In addition, apart from the solid adhesive 430, the conductive leads 220 may be clamped and secured through the fixing structure 400 in the following manner. The conductive leads 220 are clamped tightly through the design of an inner diameter of the channel 410, so as to secure the conductive leads 220.

Figure 5:
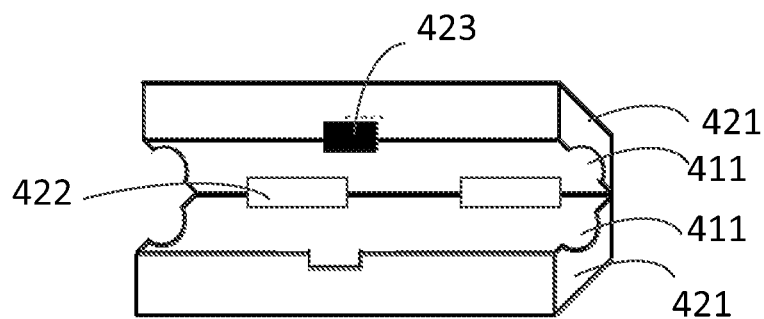
FIG. 5 is schematic view showing a clamping member.

Furthermore, in some exemplary embodiments of the present disclosure, as shown in FIG. 5, the clamping main body 420 includes two shells 421 capable of being connected to each other in a snap-fit manner, the two shells 421 are hinged to each other via a hinge 422 at one side and connected to each other at the other side via a snap-fitting assembly 423, a groove 411 is formed in each shell 421, and when the two shells 421 are connected to each other in the snap-fit manner, two grooves 411 cooperate to form the channel 410.

Figure 6:
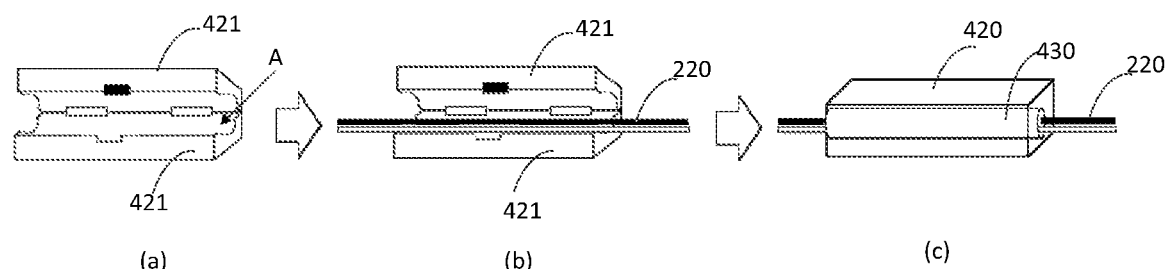
FIG. 6 is a schematic view showing steps for securing conductive leads through the clamping member in a method for manufacturing the dimming glass according to some embodiments of the present disclosure.

Based on the above-mentioned scheme, when assembling the dimming glass, as shown in FIG. 6, the snap-fitting assembly 423 may be opened to separate the two shells of the clamping main body 420 (as shown in FIG. 6 (*a*)), the solid adhesive 430 is coated in a region A of the groove 411, the conductive leads 220 are laid in the groove 411 coated with the solid adhesive 430 (as shown in FIG. 6 (*b*)), and then the snap-fitting assembly is closed to enable the two shells 421 to connected to each other in the snap-fit manner (as shown in FIG. 6 (*c*)). In this way, the structure is simple, the assembly is convenient, and the solid adhesive 430 is uniformly coated. It should be appreciated that the above-mentioned clamping main body 420 is arranged in a split-type manner, and able to be opened or closed, but in practical applications, the clamping main body 420 may also be arranged in a one-piece manner.

It should be further appreciated that, in the above-described embodiments, the two shells in the clamping main body 420 are hinged to each other at one side and connected to each other at the other side via the snap-fitting assembly, so as to enable the two shells to be opened and closed. In other embodiments not illustrated, the two shells in the clamping main body 420 may also be connected to each other through other manners so as to enable the two shells to be opened and closed. For example, two opposite sides of the two shells are connected to each other in the snap-fit manner, which will not be particularly defined herein.

In addition, there may be one or more fixing structures 400. To further improve a pulling force that the conductive leads 220 is capable of bearing, in some exemplary embodiments of the present disclosure, the quantity of fixing structures 400 is at least two. It should be appreciated that, the specific quantity of fixing structures 400 may be reasonably selected according to practical applications.

Furthermore, in some exemplary embodiments of the present disclosure, a distance that the extension segment 223 of each conductive lead 220 extends in the first direction X may range from 15 cm to 20 cm, and the fixing structure 400 may have a maximum length of 1 cm to 10 cm in the first direction X. For example, the maximum length of the fixing structure 400 in the first direction X may be 3 cm to 4 cm.

The fixing structure 400 has a maximum height of 1 mm to 25 mm in the second direction perpendicular to the glass substrate. For example, the height of the fixing structure in the second direction Y perpendicular to the glass substrate 100 is less than a height of a gap between the two glass substrates 100, and is about 6-8 mm. The fixing structure 400 may have a maximum width of 1 mm to 20 mm in a third direction perpendicular to the first direction and the second direction. For example, the width of the fixing structure in the third direction Z perpendicular to the first direction X and the second direction Y is 8 mm to 10 mm. The channel 410 may have an inner diameter greater than or equal to a sectional area of the plurality of conductive leads 220, and has a maximum inner diameter of about 1 mm to 10 mm. For example, the channel 410 has an inner diameter of 3 mm to 4 mm.

It should be appreciated that, in practical applications, the parameters of a size of the fixing structure 400 and the length of the extension segment 223 may be reasonably selected according to practical requirements, which will not be particularly defined herein.

Furthermore, in some exemplary embodiments of the present disclosure, as shown in FIGS. 1 and 3, the extension segment 223 is configured to: after extending from the connecting end 221, bend towards a side where the dimming functional layer 200 is located, and after extending in the first direction X for a predetermined distance, bend towards the outer side of the glass substrate 100 and extend out of the glass substrate 100. That is, the extension segment 223 may be laid toward the inner side (i.e., toward the side where the dimming functional layer 200 is located) as possible, so that the conductive lead 220 is protected in a better manner after the sealant 300 is cured, thereby the conductive lead 220 is less likely to be pulled out.

In some embodiments of the present disclosure, the sealant 300 may be made of any appropriate material such as black butyl sealant. Preferably, the fixing structure 400 has a same color as the sealant 300.

Further, the quantity of dimming functional layers 200 may be one or at least two. FIG. 1 and FIG. 2 each shows a case where there is one dimming functional layer 200. In the embodiments of the present disclosure, at least two conductive leads 220 are connected to the bonding circuit board 210 and pass through the channel 410 of the same clamping member. In this way, it is able to save the cost, provide a simple structure and facilitate the assembly.

FIG. 3 and FIG. 4 each shows a case where there are two dimming functional layers 200. In the embodiments of the present disclosure, there are at least two dimming functional layer 200, at least two conductive leads 220 are connected to the bonding circuit board 210 of each dimming functional layer 200, and multiple conductive leads 220 of the at least two dimming functional layers 200 pass through the channel 410 of a same clamping member. In this way, multiple conductive leads 220 of different dimming functional layers 200 share the clamping member, so as to save the quantity of clamping members, reduce the cost, and facilitate the assembly.

It should be appreciated that when there are at least two dimming functional layers 200, multiple conductive leads 220 of the same dimming functional layer 200 may share the same clamping member, while conductive leads 220 of different dimming functional layers 200 do not share the same clamping member.

It is should be further appreciated that, one of the two glass substrates 100 is an interior glass substrate 100, the other thereof is an exterior glass substrate 100, the conductive leads 220 of the dimming functional layer 200 may be secured onto the interior glass substrate 100 via the clamping member, or the exterior glass substrate 100 via the clamping member. When there are at least two dimming functional layers 200, the conductive leads 220 corresponding to the dimming functional layer 200 close to the interior glass substrate 100 are secured onto the interior glass substrate 100 via the clamping member, and the conductive leads 220 corresponding to the dimming functional layer 200 close to the exterior glass substrate 100 are secured onto the exterior glass substrate 100 via the clamping member.

In addition, in the related art, the bonding circuit board 210 is directly connected to the printed circuit board at the outer side of the bonding circuit board, the printed circuit board is connected to the glass substrate 100 in the snap-fit manner, the conductive leads 220 are directly extracted from the printed circuit board, and when the conductive lead 220 is pulled, the printed circuit board is easy to loosen. However, in some exemplary embodiments of the present disclosure, as shown in the figures, the bonding circuit board 210 includes conductive spacers 211 to which the conductive leads 220 are directly connected through welding. Since the conductive leads 220 may extend the predetermined distance in the first direction X, and/or the conductive leads 220 are secured through the fixing structure 400, and the conductive leads 220 are further secured through the sealant 300, the printed circuit board is not provided in the embodiments of the present disclosure, and the conductive leads 220 are directly secured to the conductive spacers of the bonding circuit board 210 through welding, it is able to reduce the cost, be applicable to products of various sizes, and avoid the phenomenon that the printed circuit board becomes loose easily.

In some embodiments of the present disclosure, as shown in FIGS. 1 and 3, a welding position where each conductive lead 220 is connected to each the conductive spacer through welding is wrapped with an anti-oxidation protection layer 224, so as to prevent oxidation at the welding position. The anti-oxidation protection layer 224 may be any appropriate material such as acetate cloth.

Furthermore, in an exemplary embodiment of the present disclosure, as shown in FIGS. 1 to 4, the dimming glass further includes a support frame 600 located between the two glass substrates 100 and at a periphery of the dimming functional layer 200, and the sealant region 110 is located at a periphery of the support frame 600. The support frame 600 may be such a metal frame as an aluminum frame. The strength of the hollow tempered structure is improved through the support frame 600. The fixing structure 400 may be not adhered to the support frame 600.

The present disclosure further provides in some embodiments a method for manufacturing the above-mentioned dimming glass. The method includes the following steps.

Step S01, the dimming functional layer 200 is attached to one of the glass substrates 100.

The dimming functional layer 200 may be attached to a surface of the interior glass substrate 100 at a high temperature and a high pressure via an adhesive layer such as a PVB (polyvinyl butyral) adhesive film.

Step S02, the plurality of conductive leads 220 is laid at the bonding side of the dimming functional layer 200 in the sealant region 110.

The conductive leads 220 are laid on the surface of the interior glass substrate 100.

Step S03, the other one of the glass substrates 100 is placed on the dimming functional layer 200, and the sealant 300 is filled between the sealant regions 110 of two the glass substrates 100, the extension segment 223 is secured through the sealant 300.

The exterior glass substrate 100 may be placed on the dimming functional layer 200, and the sealant 300 is pressed into the gap between the interior glass substrate 100 and the exterior glass substrate, and after the sealant 300 is cured, the excess sealant protruding the outer side of the glass substrate 100 is removed.

Illustratively, subsequent to step S02, the method further includes: step S021, securing the extension segment 223 is through the fixing structure 400, and securing the fixing structure 400 is to the glass substrate 100 through an adhesive 500.

Specifically, the step S021 includes: opening the two shells of the fixing structure 400, coating the solid adhesive 430 (the glass cement, the silicone adhesive or the resin adhesive, etc.) in the groove, laying the conductive leads 220 in the groove coated with the solid adhesive 430, closing the fixing structure 400 through the snap-fitting assembly, and applying a strong adhesive to the bottom of the closed fixing structure 400, so as to enable the closed fixing structure 400 to be adhered to the surface of the glass substrate 100.

Hereinafter, the method for manufacturing the dimming glass will be described in more detail by taking the embodiments shown in FIGS. 1 and 3 as examples. The method includes the following steps.

Step S01, the conductive leads 220 are connected to the conductive spacers of the bonding circuit board 210 of the dimming functional layer 200 through welding, the dimming functional layers 200 (Cell1 and Cell2 in the figure) are attached to a surface of the interior tempered glass at a high temperature and a high pressure by using an adhesive layer, such as a PVB (polyvinyl butyral) adhesive film, and an anti-oxidation prevention layer, such as an acetic acid cloth, is used to wrap the welding position so as to prevent the oxidation thereof.

Step S02, the conductive leads 220 are laid on the surface of the interior tempered glass, and at least a certain length of the conductive leads are laid as close to one side of the support frame as possible.

Step S021, the two shells of the clamping member are opened, the solid adhesive 430 (the glass cement, the silicone adhesive or the resin adhesive, etc.) is coated in the groove, the conductive leads 220 are laid in the groove coated with the solid adhesive 430, and the fixing structure 400 is closed through the snap-fitting assembly, and a strong adhesive is applied to the bottom of the closed clamping member, so as to enable the clamping member to be adhered to the surface of the glass substrate 100.

Step S03, the exterior glass substrate 100 may be placed on the dimming functional layer 200, and the sealant 300 is pressed into the gap between the interior glass substrate 100 and the exterior glass substrate, and after the sealant 300 is cured, the excess sealant protruding the outer side of the glass substrate 100 is removed to obtain the dimming glass.

In the embodiments of the present disclosure, it is able to reduce the probability that the electrical connection structure of the dimming glass is damaged during the installation process, and ensure the normal driving of the dimming functional layer 200.

A test experiment on the pull stress of the conductive leads 220 of the dimming glass in the embodiments of the present disclosure and the dimming glass in the related art are performed in the present disclosure.

In the test experiment, as Embodiment 1 and Embodiment 2 corresponding to the dimming glass of the present disclosure are provided, the quantity of clamping members in Embodiment 1 is two and the quantity of clamping members in Embodiment 2 is one. The dimming glass in the related art is used as a reference example.

The test process is as follows.

Firstly, the dimming glass is energized, so that the internal dimming functional layer 200 thereof is in an on state.

Next, the dimming glass is placed on the ground and secured, and an external lead is pulled in a direction perpendicular to the ground by using a pull scale, so that an actual installation process where the dimming glass is squeezed and pulled by the peripheral metal section bar may be simulated.

Next, the conductive leads 220 are pulled hard until the dimming functional layer 200 inside the dimming glass fails, where the inner electrical connection is considered as failure when a light transmittance of dimming functional layer 200 suddenly becomes small.

A test result is as follows.

In the dimming glass of Embodiment 1, the conductive leads 220 thereof is capable of bearing a pulling force of 40 Kg or more, a force-bearing point during the pulling process of the leads is located at a position where the fixing structure 400 is adhered to the glass substrate 100, and when the fixing structure 400 is broken, the external force is transmitted to the welding position between the printed circuit board and the conductive lead 220.

In the dimming glass of Embodiment 2, the conductive leads 220 thereof is capable of bearing a pulling force of 34 Kg or more, a force-bearing point during the pulling process of the leads is located at the position where the fixing structure 400 is adhered to the glass substrate 100, and when the fixing structure 400 is broken, the external force is transmitted to the welding position between the printed circuit board and the conductive lead 220.

In the dimming glass of the reference example, the conductive leads 220 is capable of bearing a pulling force of 6 Kg or more.

In other words, the strength of the conductive leads 220 in the dimming glass in the embodiments of the present disclosure is increased by 7 times. When the dimming glass is installed in an actual construction, a force of frictional, squeezing and pulling between the side surface of the dimming glass and the metal section frame is about 5 Kg to 15 Kg. Therefore, according to the dimming glass and the method for manufacturing the dimming glass in the embodiments of the present disclosure, it is able to effectively reduce the probability that the electrical connection structure of the dimming glass is damaged during the installation process, and ensure the normal driving of the dimming functional layer 200.

Some descriptions will be given as follows.

(1) The drawings merely relate to structures involved in the embodiments of the present disclosure, and the other structures may refer to those known in the art.

(2) For clarification, in the drawings for describing the embodiments of the present disclosure, a thickness of a layer or region is zoomed out or in, i.e., these drawings are not provided in accordance with an actual scale. It should be appreciated that, in the case that such an element as layer, film, region or substrate is arranged "on" or "under" another element, it may be directly arranged "on" or "under" the other element, or an intermediate element may be arranged therebetween.

(3) In the case of no conflict, the embodiments of the present disclosure and the features therein may be combined to acquire new embodiments.

The above embodiments are merely for illustrative purposes, but shall not be construed as limiting the scope of the present disclosure. The scope of the present disclosure shall be subject to the scope defined by the appended claims.

What is claimed is:

1. A dimming glass, comprising:
   two glass substrates arranged oppositely to form a cell;
   at least one dimming functional layer arranged between the two glass substrates, wherein an edge of each glass substrate has a sealant region which is not covered by the dimming functional layer, at least one side of the dimming functional layer is a bonding side, a bonding circuit board is arranged at the bonding side of the dimming functional layer, and a plurality of conductive leads is connected to the bonding circuit board; and
   a sealant, wherein the sealant is filled between sealant regions of the two glass substrates;
   wherein each conductive lead comprises a connecting end, a protruding end and an extension segment connecting the connecting end and the protruding end, the connecting end is connected to the bonding circuit board, the protruding end extends to an outer side of an edge of the glass substrate, at least a part of the extension segment extends in a first direction, the first direction is an extension direction of an edge of the bonding side of the dimming functional layer, and the extension segment is at least partially located in the sealant region and secured through the sealant.

2. The dimming glass according to claim 1, wherein the extension segment is laid in the sealant region of at least one of the glass substrates, at least one fixing structure is secured in the sealant region, and the extension segment is partially secured in the sealant region through the fixing structure.

3. The dimming glass according to claim 2, wherein each fixing structure comprises a clamping member, the clamping member comprises a clamping main body, a channel is provided in such a manner as to penetrate through the clamping main body, and the extension segment passes through the channel and is secured to the channel through a solid adhesive.

4. The dimming glass according to claim 3, wherein the clamping main body comprises two shells capable of being connected to each other in a snap-fit manner, the two shells are hinged to each other at one side and connected to each other at the other side via a snap-fitting assembly, a groove is formed in each shell, and when the two shells are connected to each other in the snap-fit manner two grooves cooperate to form the channel.

5. The dimming glass according to claim 3, wherein there is one dimming functional layer, and at least two conductive leads are connected to the bonding circuit board and pass through the channel of a same clamping member.

6. The dimming glass according to claim 2, wherein the quantity of fixing structures is at least two.

7. The dimming glass according to claim 2, wherein the fixing structure is secured to the glass substrate through an adhesive.

8. The dimming glass according to claim 2, wherein the extension segment is configured to: after extending from the connecting end, bend towards a side where the dimming functional layer is located, and after extending in the first direction for a predetermined distance, bend towards the outer side of the glass substrate and extend out of the glass substrate.

9. The dimming glass according to claim 2, wherein the fixing structure has a maximum length of 1 cm to 10 cm in the first direction, a maximum height of 1 mm to 25 mm in a second direction perpendicular to the glass substrate, and a maximum width of 1 mm to 20 mm in a third direction perpendicular to the first direction and the second direction, and the channel has a maximum inner diameter of 1 mm to 10 mm.

10. The dimming glass according to claim 1, wherein the bonding circuit board comprises conductive spacers to which the conductive leads are directly connected through welding.

11. The dimming glass according to claim 10, wherein a welding position where each conductive lead is connected to each conductive spacer through welding is wrapped with an anti-oxidation protection layer.

12. The dimming glass according to claim 2, wherein the dimming glass further comprises a support frame located between the two glass substrates and at a periphery of the dimming functional layer, and the sealant region is located at a periphery of the support frame.

13. A method for manufacturing the dimming glass according to claim 1, comprising:
attaching the dimming functional layer to one of the glass substrates;
laying the plurality of conductive leads at the bonding side of the dimming functional layer in the sealant region;
placing the other one of the glass substrates on the dimming functional layer, and filling the sealant between the sealant regions of two the glass substrates, wherein the extension segment is secured through the sealant.

14. The method according to claim 13, wherein the extension segment is laid in the sealant region of at least one of the glass substrates, at least one fixing structure is secured in the sealant region, and the extension segment is partially secured in the sealant region through the fixing structure, and the fixing structure is secured to the glass substrate through an adhesive, subsequent to laying the plurality of conductive leads at the bonding side of the dimming functional layer in the sealant region, the method further comprises:

securing the extension segment through the fixing structure, and securing the fixing structure to the glass substrate through an adhesive.

15. The dimming glass according to claim 3, wherein there are at least two dimming functional layers, at least two conductive leads are connected to the bonding circuit board of each dimming functional layer, and multiple conductive leads of the at least two dimming functional layers passes through the channel of a same clamping member.

16. The dimming glass according to claim 5, wherein the dimming functional layer comprises a dye liquid crystal dimming layer, an alignment layer, a driving electrode and substrates.

17. The dimming glass according to claim 12, wherein the support frame is located between the dimming functional layer and the fixing structure in a second direction perpendicular to the first direction.

18. The method according to claim 13, wherein the extension segment is laid in the sealant region of at least one of the glass substrates, at least one fixing structure is secured in the sealant region, and the extension segment is partially secured in the sealant region through the fixing structure.

19. The method according to claim 18, wherein each fixing structure comprises a clamping member, the clamping member comprises a clamping main body, a channel is provided in such a manner as to penetrate through the clamping main body, and the extension segment passes through the channel and is secured to the channel through a solid adhesive.

20. The method according to claim 19, wherein the clamping main body comprises two shells capable of being connected to each other in a snap-fit manner, the two shells are hinged to each other at one side and connected to each other at the other side via a snap-fitting assembly, a groove is formed in each shell, and when the two shells are connected to each other in the snap-fit manner two grooves cooperate to form the channel.

* * * * *